Feb. 9, 1954  P. WORMSER ET AL  2,668,619
DEVICE FOR ASSORTING LONG STEMMED CHERRIES
FROM SHORT STEMMED CHERRIES
Filed April 17, 1950  8 Sheets-Sheet 1

INVENTOR.
PAUL WORMSER
DAVID MADRID
BY
*Herbert E. Metcalf*
THEIR PATENT ATTORNEY Feb. 9, 1954

P. WORMSER ET AL 2,668,619

DEVICE FOR ASSORTING LONG STEMMED CHERRIES FROM SHORT STEMMED CHERRIES

Filed April 17, 1950

INVENTOR.
PAUL WORMSER
DAVID MADRID
BY
Herbert E. Medcalf
THEIR PATENT ATTORNEY

Feb. 9, 1954 P. WORMSER ET AL 2,668,619
DEVICE FOR ASSORTING LONG STEMMED CHERRIES
FROM SHORT STEMMED CHERRIES
Filed April 17, 1950 8 Sheets-Sheet 3
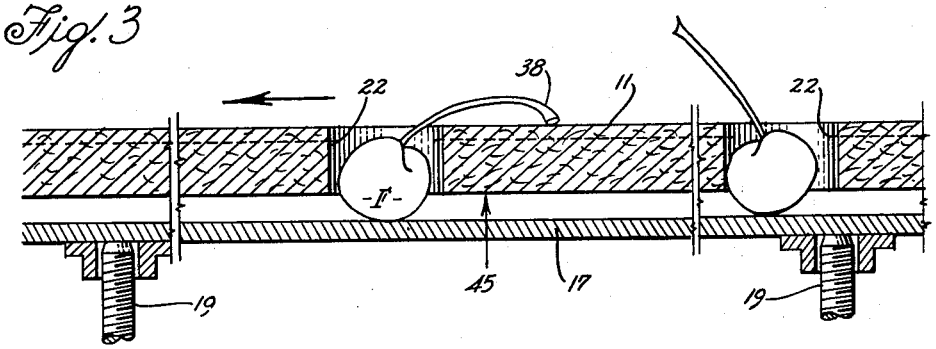
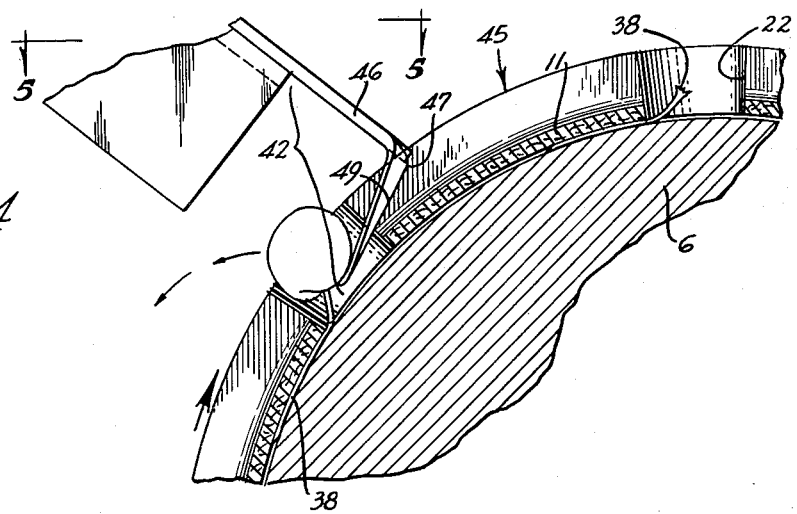
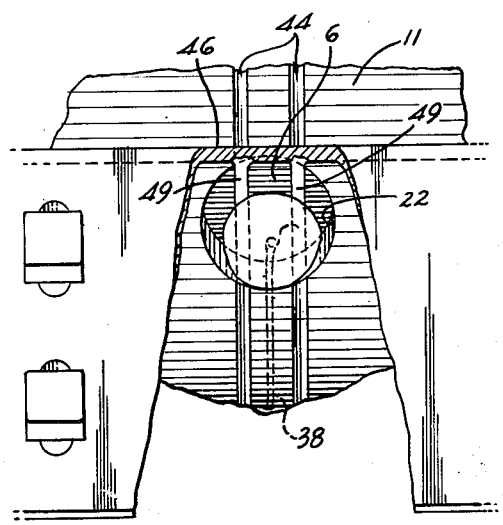
INVENTOR.
PAUL WORMSER
DAVID MADRID
BY
Herbert E. Metcalf
THEIR PATENT ATTORNEY Feb. 9, 1954 P. WORMSER ET AL 2,668,619
DEVICE FOR ASSORTING LONG STEMMED CHERRIES
FROM SHORT STEMMED CHERRIES
Filed April 17, 1950 8 Sheets-Sheet 5
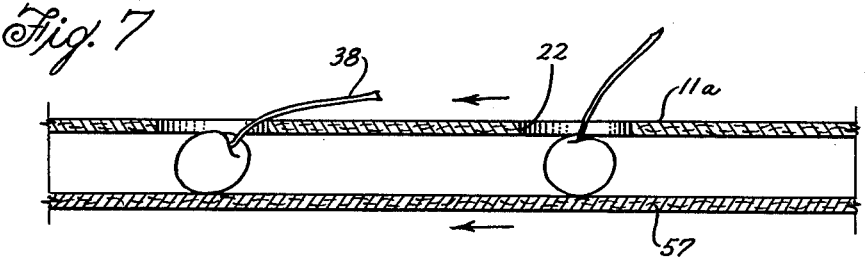
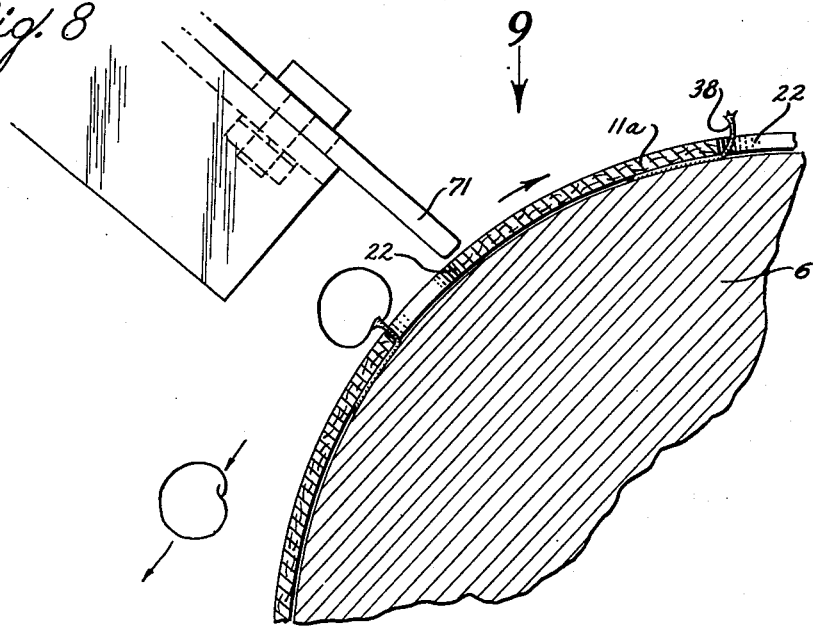
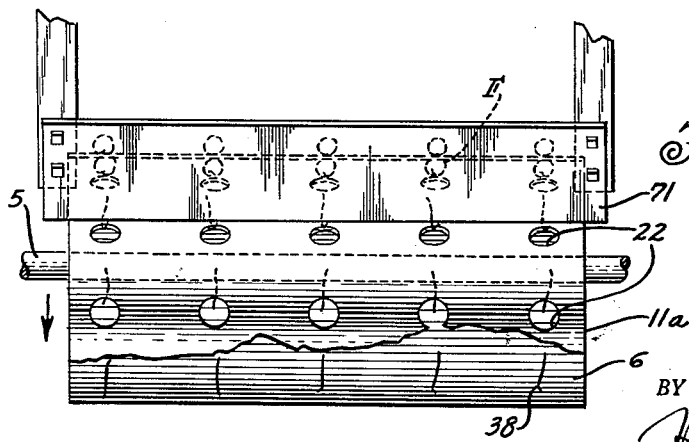
INVENTOR.
PAUL WORMSER
DAVID MADRID
BY
Herbert E. Metcalf
THEIR PATENT ATTORNEY

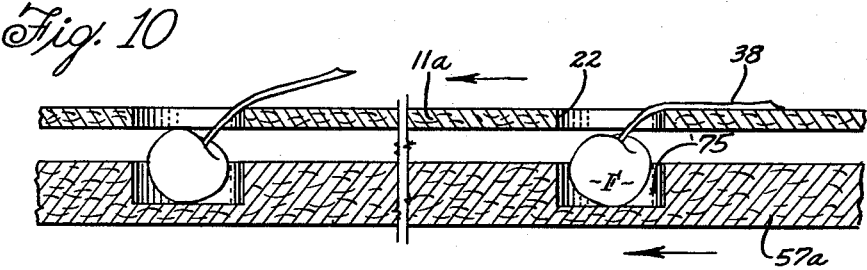
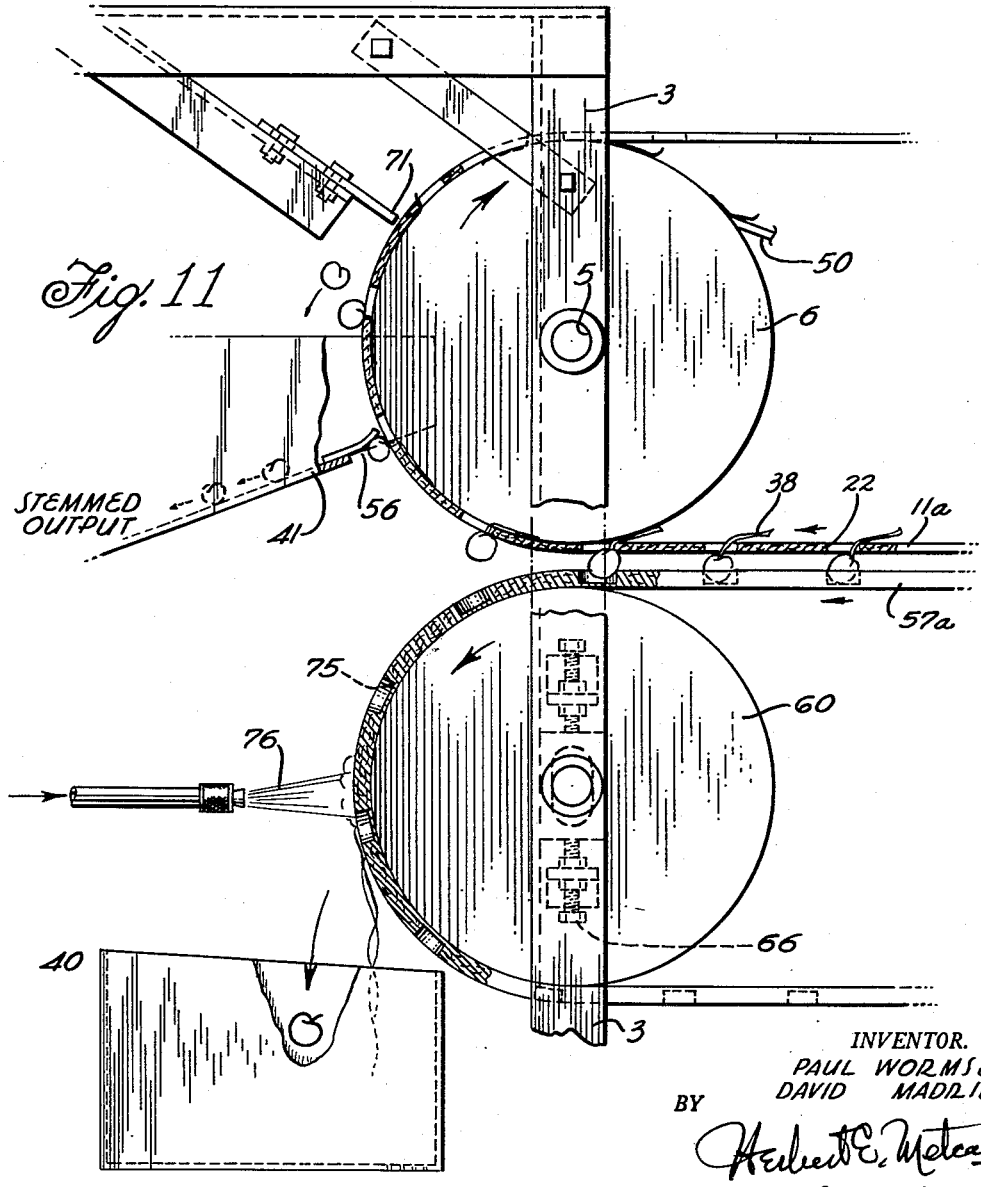

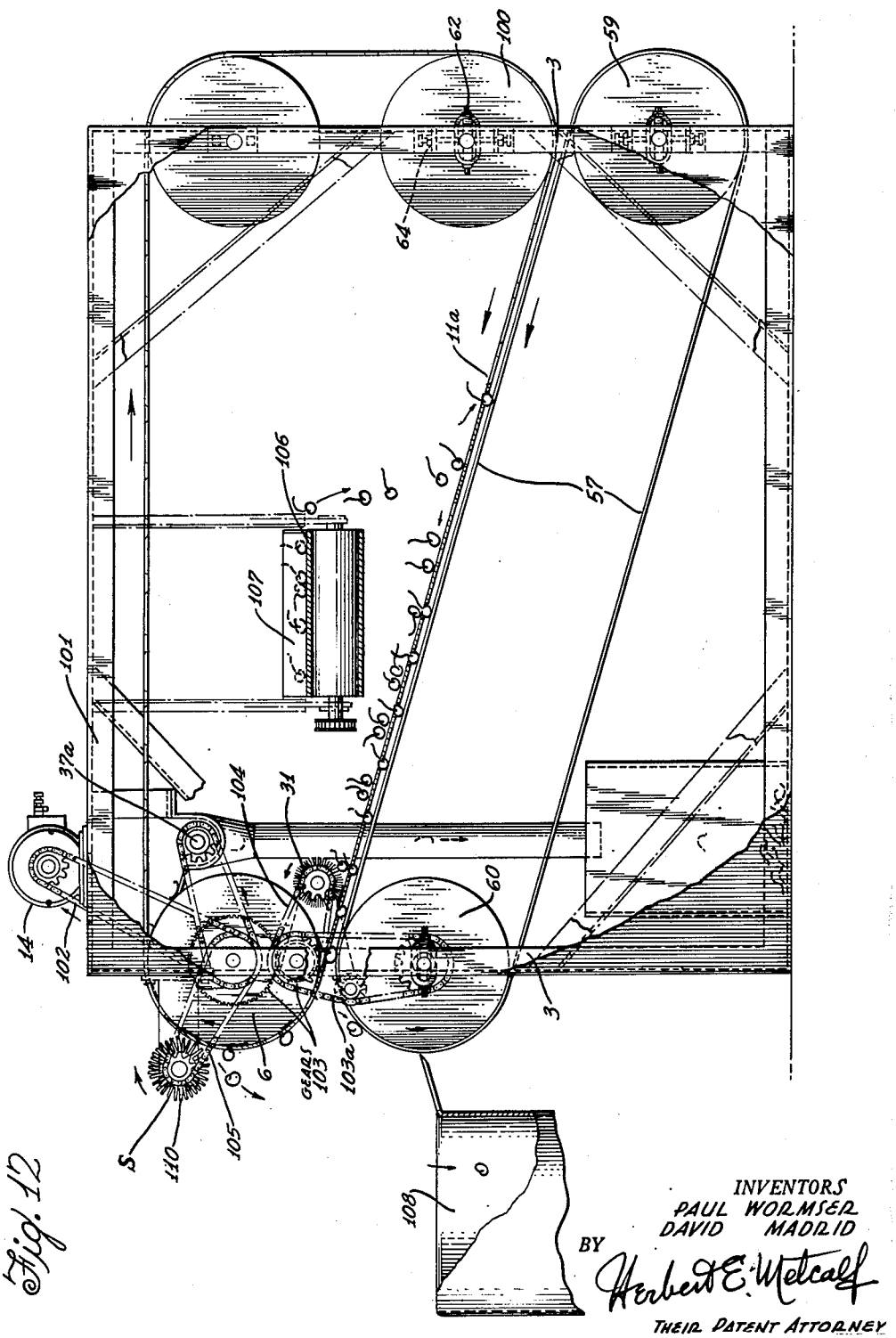

Feb. 9, 1954    P. WORMSER ET AL    2,668,619
DEVICE FOR ASSORTING LONG STEMMED CHERRIES
FROM SHORT STEMMED CHERRIES
Filed April 17, 1950    8 Sheets-Sheet 8
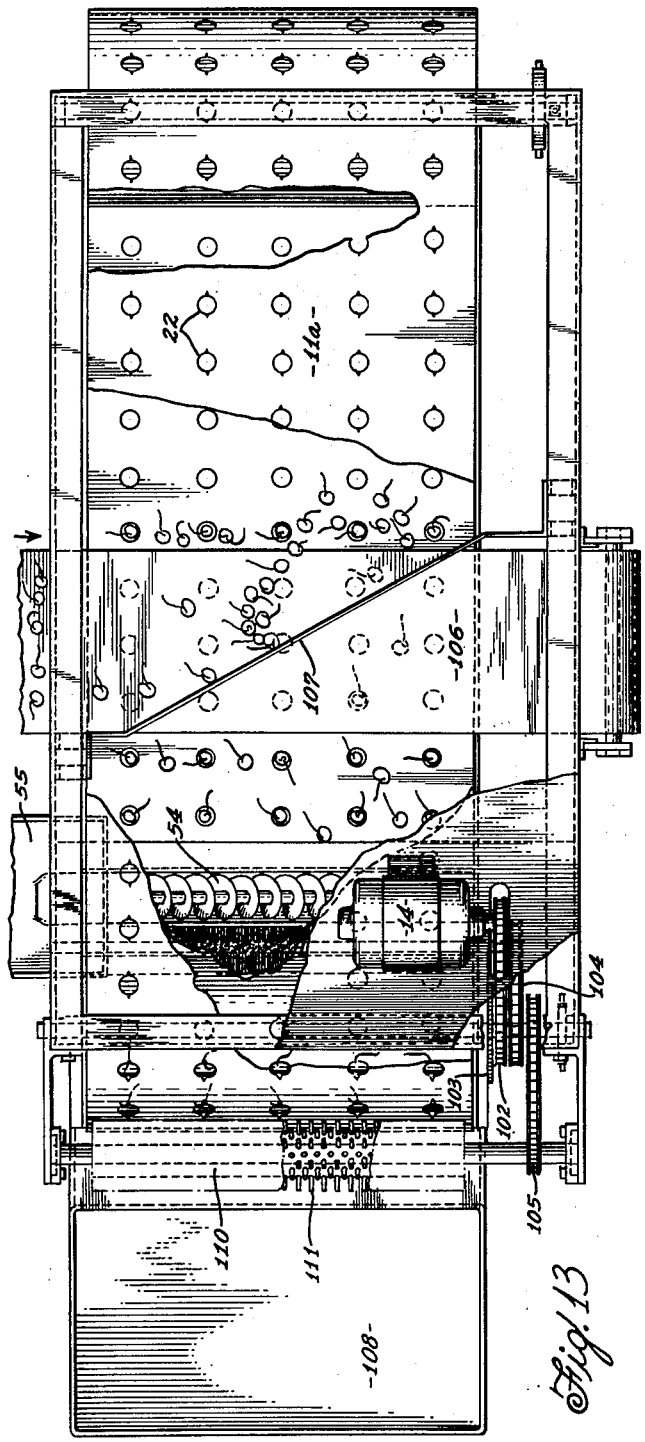
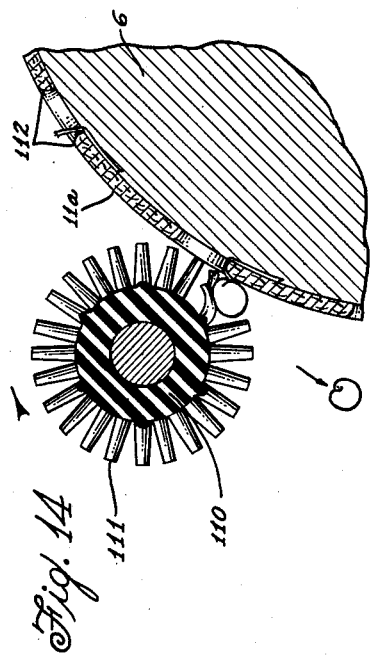
INVENTORS:
PAUL WORMSER
DAVID MADRID
BY
*Herbert E. Metcalf*
THEIR PATENT ATTORNEY Patented Feb. 9, 1954

2,668,619

UNITED STATES PATENT OFFICE 2,668,619

DEVICE FOR ASSORTING LONG STEMMED CHERRIES FROM SHORT STEMMED CHERRIES

Paul Wormser and David Madrid, San Francisco, Calif., assignors to S & W Fine Foods, Inc., San Francisco, Calif., a corporation of California Application April 17, 1950, Serial No. 156,256

2 Claims. (Cl. 209—108)

The present invention relates to machines for removing stems from fruit and is particularly adapted for removing stems from fruit such as cherries, for example.

While many devices of various types have been in use for removing stems from fruit such as cherries, for example, most of these devices operate on a probability basis so that constant inspection of the output is necessary to remove therefrom fruit that has not been stemmed. Furthermore, another disadvantage of many of the presently known types of stemming machines is that fruit with stems shorter than normal are not stemmed. In consequence, such unstemmed fruit has to be manually removed from the output of the machine.

It is an object of the present invention to provide a fruit stemming device wherein substantially all fruit passed to the output of the device is properly stemmed.

It is another object of the invention to provide a fruit stemmer in which the majority of fruit with short stems that cannot be removed by the stemming action of the machine are automatically separated from the properly stemmed fruit output of the device.

It is still another object of the invention to provide a fruit stemmer that will operate properly to stem batches of fruit having a wide variation in the diameter of the fruit.

Among additonal objects of the invention are:

To provide a simple and rapid means and method of stemming fruit such as cherries and plums, for example;

To provide a means and method of stemming fruit with a minimum of improperly stemmed fruit in the output thereof, thereby greatly reducing the amount of output inspection required;

To provide a simple fruit stemmer in which fruit damage is negligible;

To provide a fruit stemmer operated on a positive rather than a probability stemming basis;

To provide a fruit stemmer capable of high speed operation; and

To provide a fruit stemmer that is readily adjustable for fruit of different average diameters.

Other objects and advantages of the invention will be readily understood by reference to the accompanying drawings, in which:

Figure 3 is a longitudinal, vertical sectional view of a portion of the carrier used in the device of Figure 1, while said carrier is horizontal.

Figure 4 is a view similar to Figure 3, showing the carrier as it rises past a fruit separation position.

Figure 5 is a plan view looking toward the carrier as shown in Figure 4, taken as indicated by arrow 5, in Figure 4, the support for the separation comb being partly cut away.

Figure 7 is a longitudinal vertical sectional view of the carriers of the device shown in Figure 6, taken in the horizontal part of the carrier path.

Figure 8 is a view similar to Figure 4 showing the upper carrier of Figures 6 and 7 as it rises past the fruit separation position.

Figure 9 is a plan view, partly cut away, viewed as indicated by arrow 9 in Figure 8.

Figure 10 is a longitudinal vertical sectional view of an alternate form of double carrier operable on the frame of the machine of Figure 6.

Figure 11 is a side view of the fruit separation end of a machine using the double carrier shown in Figure 10.

Figure 12 is a longitudinal sectional view of a machine having an inclined carrier belt.

Figure 13 is a top plan view, partly cut away, of the machine of Figure 12.

Figure 14 is a side view, partly in section, of a separation roller having flexible teeth.

One preferred embodiment of the present invention is shown in Figures 1 to 5, inclusive, which will be first referred to.

Figure 1:
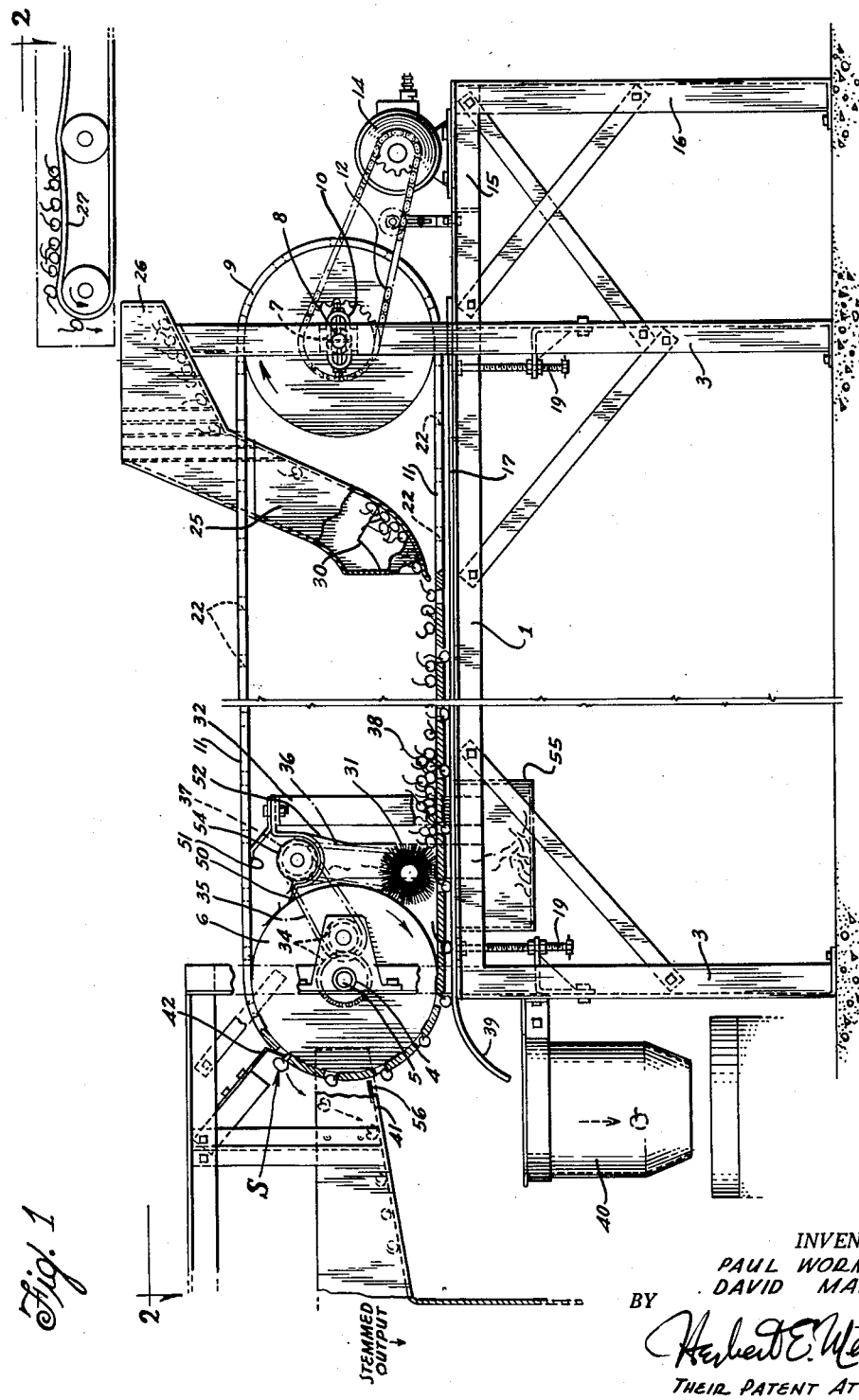
Figure 1 is a side view of one form of fruit stemmer suitable for processing cherries, embodying the present invention.
Figure 2:
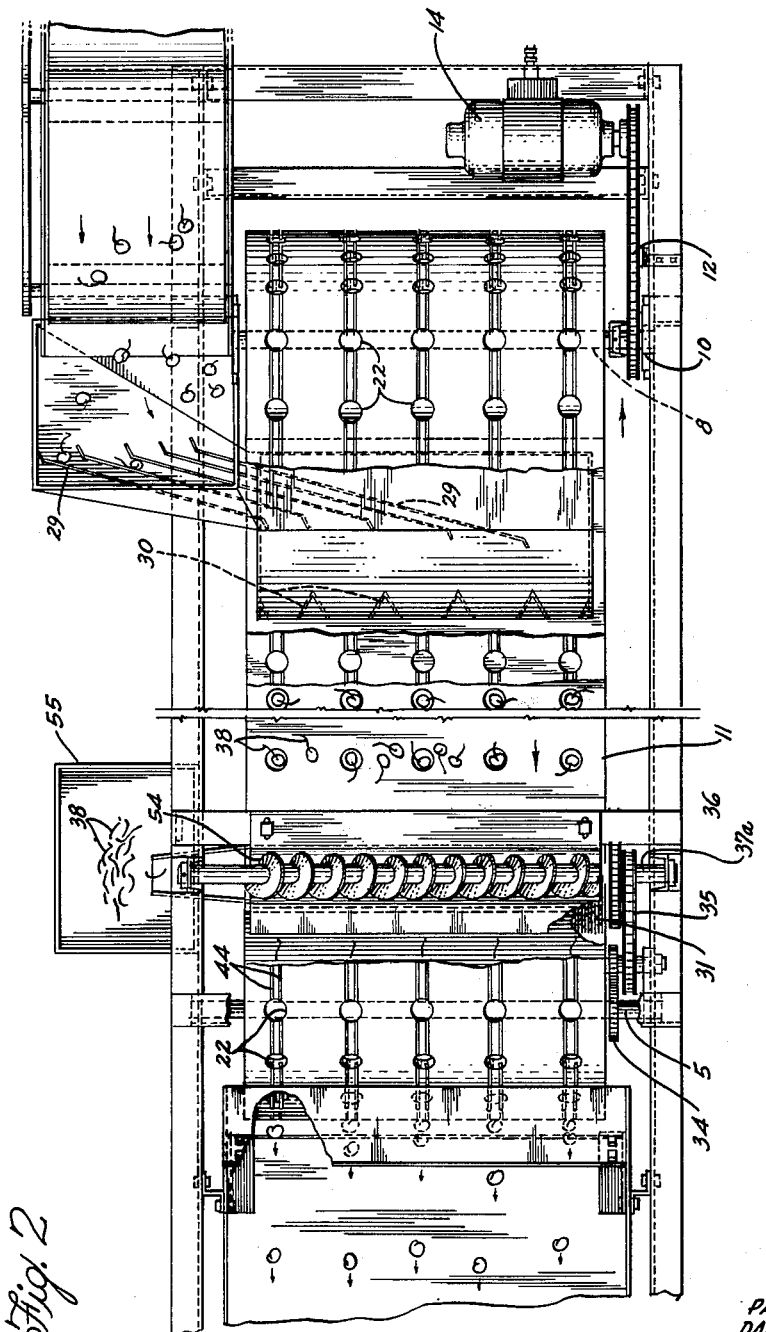
Figure 2 is a top plan view, partly cut away, of the machine of Figure 1.

As best shown in Figures 1 and 2, the stemming machine is mounted on a horizontal frame 1 supported from a foundation member 2 by upright frame legs 3. At one end of the machine, legs 3 are extended upwardly beyond frame 1 to form opposite supports for separation drum shaft bearings 4 rotatably holding a separation drum shaft 5 in a horizontal position. A separation drum 6 is mounted on separation drum shaft 5.

At the other end of the machine frame legs 3 are similarly extended upwardly to support opposite carrier drum bearings 7 in which is journalled a carrier drum shaft 8 supporting a carrier drum 9 also rotatable on a horizontal axis. Preferably, carrier drum bearings are adjustable longitudinally by bearing adjustment means 10.

Drums 6 and 9 are preferably alike in diameter and are aligned to form pulleys for an endless carrier belt 11 having a lower horizontal path.

This belt is kept taut by adjustment of carrier drum bearings and may be of the type resisting stretch by reason of having steel wires embedded therein. Carrier drum 9 is rotated by a drive chain 12 connecting the carrier belt with a drive motor 14 mounted on an extension frame 15 supported by extension legs 16. Motor 14 is also adjustable longitudinally on frame 15 to maintain proper chain tension. Spaced immediately below the carrier belt 11 and following the lower horizontal path thereof, is a slide plate 17, this plate being supported by four adjustment screws 19, one on each frame leg 3. By the use of the adjustment screws 19 slide plate 17 can be positioned a predetermined distance below the carrier belt, and be made parallel thereto.

The carrier belt is provided with rows of apertures 22, these apertures preferably being aligned lengthwise and crosswise of the carrier belt. As the apertures are to be used to receive fruit bodies, their diameter should be sufficient to permit passage of substantially all of the fruit in a roughly graded lot. Similarly, the slide plate 17 is positioned below the carrier belt a sufficient distance so that substantially all of the fruit bodies in a roughly graded fruit lot entering the apertures will rest on the slide plate 17 with the upper surface of the fruit at or just below the upper surface of the carrier belt.

Fruit, with their stems on, are loaded onto the top surface of the carrier belt 11 near the carrier drum 9 through a chute 25 entering between the upper and lower horizontal carrier belt portions from the side, this chute rising upwardly at the upper portion of the carrier belt to terminate in a hopper 26 supplied with fruit as from a delivery belt 27. The lower end of chute 25 is flared across the carrier belt and is supplied with ridges 29 and lower partitions 30 to distribute the fruit as uniformly as possible across the belt in positions to readily enter the apertures 22. This arrangement is best shown in Figure 2.

The carrier is progressed so that the lower horizontal portion thereof moves from the carrier drum 9 toward the separation drum 6, and just prior to fruit reaching the separation drum 6 a horizontal loading brush 31 is provided extending across the carrier belt 11 and supported by brush brackets 32 erected at the sides of the machine from frame 1. This brush 31 is rotated by gears 34 rotated by separation drum shaft 5, by an intermediate chain 34 and finally by a brush chain 36, all arranged at one side of the machine. Intermediate chain 35 drives brush chain 36 through two pulleys 37 connected to a worm shaft 37a. Brush 31 is rotated with the lower bristles thereof preferably in contact with the upper surface of the lower horizontal portion of the carrier belt, and moving in a direction opposite to the motion of the carrier. The brush 31 sweeps fruit backward that has not entered apertures 22 so that they will have time to do so, and further provides a sweeping action on stems 38 of the fruit that have already entered the apertures, so that these stems in general extend rearwardly on the carrier.

As the fruit passes from under the brush 31 the carrier belt starts to pass around separation drum 6, and the stems 38 of the fruit in the apertures, now projecting above the top surface of the carrier belt 11, and, when of normal length, projecting beyond the edges of the apertures 22, are caught, pinched and securely gripped between the periphery of the separation drum 6 and the carrier belt 11 surface. As soon as the stems 38 are so gripped, lower slide plate 17 terminates its position adjacent the carrier belt and then may be provided with a downturned lip 39 to direct fruit whose stems, if any are not gripped by drum 6 and carrier belt 11 contact into reject chute 40.

As the fruit whose stems 38 are gripped move upwardly, they pass the inner edge of an output baffle 41 and then rise to a separation position S.

At separation position S the fruit is separated from the gripped stems by a comb 42, as best shown in Figures 4 and 5.

Prior to describing the comb 42, Figure 3 will be referred to showing generally the size relationships of fruit and carrier.

As above described, the fruit passes through the apertures 22 to rest on the slide plate 17 with the upper surface of the fruit below the top surface of the carrier belt, as shown by fruit body F in Figure 3. In this position, the fruit is carried along by the push of the sides of the apertures 22, while slidably resting on slide plate 17. To prevent smaller fruit from becoming wedged between the lower surface of the carrier belt 11 and the upper surface of the slide plate 17, the carrier belt 11 should preferably be thick enough to reach below the horizontal equator of the smallest fruit in the lot being processed. When the belt is thickened to this extent, many of the fruit being processed will not project any great distance beyond the outer surface of the carrier belt 11 at the separation position S. In consequence, many fruit bodies would not be separated from their gripped stems if only a separation bar at the outer surface of the carrier belt 11 were to be positioned at separation position S to intercept the fruit bodies as they pass the separation position.

In consequence, we prefer, when thick carrier belts are used, to provide a pair of grooves 44 on the outer surface 45 of the carrier belt, these grooves being positioned parallel to the direction of motion of the carrier belt along each longitudinal row of apertures, with one groove on each side of aperture centers but inside the lateral edges of the apertures 22 as best shown in Figure 5. Grooves 44 extend almost to the opposite side of the carrier belt, leaving only sufficient belt material to insure adequate belt strength.

At the separation position comb 42 comprises a comb bar 46 having a lower edge 47 closely adjacent the outer surface 45 of the carrier belt, this bar carrying pairs of comb teeth 49, one tooth of each pair entering the grooves 44 associated with one row of apertures. Comb teeth 49 slope downwardly and forwardly to the bottoms of the grooves thereby passing under and providing an outward motion of the fruit body, either removing the fruit body directly from the gripped stem or moving the fruit body outwardly so that it will be intercepted by the comb bar 46 and removed from the gripped stem.

After the fruit bodies are removed from the gripped stems, the stems 38 continue around the separation drum, and when the carrier belt separates from the separation drum at the top thereof, as shown in Figure 1, the stems are intercepted by a drum scraper 50 bearing on the separation drum 6, and by a belt scraper 51 bearing against the inner surface of the carrier belt 11, thereby directing the stems into a stem trough 52 extending across the machine. Stems can be removed from this trough by a worm 54 driven by the worm shaft 37a rotated by pulleys 37. Stems 38 are carried to one side of the machine by the worm 54 and allowed to fall into a stem collector 55. If desired, water sprays can be used to facilitate stem collection.

With the machine as above described stemming is continuous and fast. The output is relatively clean for several reasons. First, all fruit having stems short enough so that they cannot be gripped as the carrier belt contacts the separation drum do not enter the output of the machine, as such fruit will fall out of the apertures by gravity when the support by the slide plate 17 ceases, and will fall into the reject chute 40. Any fruit whose stem is not gripped will also fall into the reject chute. Properly stemmed fruit cannot get into the reject chute 40 because of the output baffle 41. In consequence, the only type of improperly stemmed fruit that can get into the stemmed fruit output of the machine are a few fruit whose stems are just long enough to be caught sufficiently between the carrier belt and the separation drum 6 to be carried around the drum, but which are not gripped sufficiently to withstand separation pressure without the stem pulling out from between the carrier belt and the separation drum. Such fruit with a short length of stem thereon would normally get into the output of the machine. However, we have found that in certain types of fruit the number of such fruit can be significantly reduced by the use of a flexible edge portion 56 on baffle 41 so that a pressure less than that required for stem separation is applied to the fruit as they pass upwardly toward the separation position S. Such pressure is sufficient to dislodge many of the fruit whose short stems are just barely pinched, but does not affect fruit with long stems properly pinched. The dislodged fruit enters the reject chute and does not reach the output of the machine.

The stemmer as just above described is relatively simple, and is highly satisfactory for use with fruit that has relatively uniform diameters and that has securely fastened in the fruit. When, however, the fruit varies considerably in diameter so that a distinct possibility exists of small fruit becoming wedged between the carrier belt 11 and the slide plate 17, we prefer to utilize a modification of our invention as shown in Figures 6 to 9, inclusive.

Figure 6:
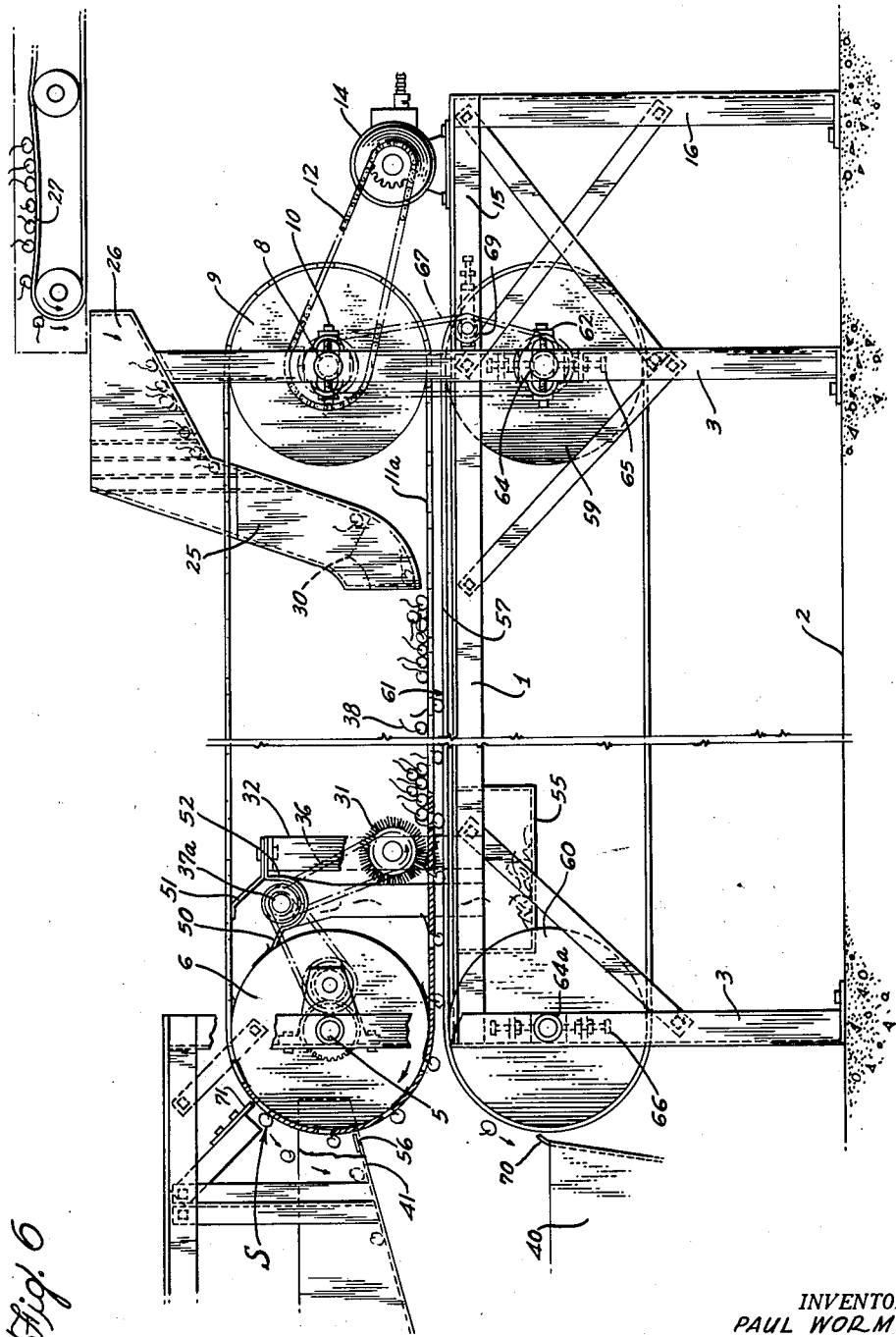
Figure 6 is a side view of a stemmer embodying a modification of the present invention, using a double carrier.

In this case, the carrier belt 11a is formed, mounted and operated in exactly the same manner as the carrier belt of Figure 1 and in the side view of Figure 6, all similar parts of the machine have been given the same numbers as used on the parts of the machine of Figures 1–5, inclusive. The only difference is that the carrier belt 11a in the machine of Figures 6 to 9, inclusive, is much thinner than the carrier belt 11 in the machine of Figures 1 to 5, inclusive, and that the separation device is slightly different, as will be fully described later. The main difference in the two machines is the means for supporting the fruit bodies in the carrier belt apertures.

Referring to Figures 6 and 7, a support belt 57 is mounted on fore and aft support drums 59 and 60, respectively, to position the upper rim 61 thereof immediately below and parallel to the lower rim of the carrier belt 11a in the same position occupied by the slide plate 17 of the machine of Figures 1–5, inclusive. Both upper and lower belts are tightened to maintain the belts substantially horizontal as by bearing adjustment means 19 for the carrier belt, and lower tightening adjustment 62 for the support belt 57, the latter adjustment operating on the bearings 64 for the fore support drum 59. As was the slide plate 17, the support belt is vertically adjustable as by vertical adjustment screws 65 and 66 operating one fore and aft support drum bearings 64 and 64a respectively. Normally, belts 11a and 57 can be tightened sufficiently to prevent significant sag, but if desired belt support bars (not shown) can be used under both belts 11a and 57.

Support belt 57 is driven in the same direction as the carrier belt 11a by a connecting belt 67 driving the fore drum 59 of the support belt system from the carrier drum 9 immediately above. To permit vertical adjustment of the support belt 57, an idler pulley 69 is provided for the connecting belt 67. At the separation end of the machine, aft support drum 60 is positioned directly below separation drum 6 so that the support belt 57 passes downwardly around the aft support drum 60 as the carrier belt 11a passes upwardly around the separation drum 6.

Preferred dimensional relationships between the carrier and support belts and the fruit is shown in Figure 7 where both the carrier belt 11a and the support belt 57 are relatively thin and where the two belts are spaced so that small fruit for example may have their upper surface level with or even below the carrier belt. As we prefer to progress both belts in the same direction there is no tendency for small fruit to become wedged between upper and lower belts. Thus, by making apertures 22 of the general diameter of the largest fruit in the lot, with a similar distance between the upper surfaces of the two belts, fruit of widely varying diameters can be successfully loaded into the apertures and successfully transported therein. In order to throw the stems rearwardly, we prefer to progress the support belt at a slightly faster rate than the carrier belt.

As in the machine of Figures 1–5, inclusive, fruit with stems on are loaded onto the carrier belt 11a through the chute 25 and hopper 26.

Loading brush 31 loads them individually through the apertures 22 on the carrier belt 11a to rest on the support belt 57. The brush 31 sweeps the stems backward from the aperture and in this case they tend to stay as swept, because there is no relative movement between the carrier and support belts. As the projecting stems of the fruit in the apertures are gripped between the carrier belt 11a and the separation drum 6, the support belt 57 terminates fruit support by turning downwardly over the aft support drum 60 and all fruit whose stems are not gripped fall into reject chute 40 guided by a support belt scraper 70 bearing against the support belt after it has passed about one-fourth way around the aft support drum 60. In addition, any fruit or pieces thereof or other trash that might have entered apertures 22 in the carrier belt to be trapped between the two belts will be carried to the reject chute by the motion of the support belts 57. Thus the machine of Figures 6 to 9, inclusive, is self-cleaning.

Fruit that are carried upwardly around separation drum 6 first pass output baffle 41 and then approach the separation position S. As the carrier belt in this modification can be very thin, no comb is needed for separation of the fruit from the stems, and a stationary separation bar 71 extending across the carrier belt 11a at the separation position S has been found sufficient for effective separation, as even the smallest fruit liable to be properly loaded, gripped and carried to the separation position S will be intercepted by the separation bar 71, the active edge of which is, of course, close to the outer surface of the carrier belt, as best shown in Figures 8 and 9.

Thus, while the machine of Figures 6-9, inclusive is somewhat more complicated than the simple device of Figures 1-5, inclusive, it possesses numerous compensating advantages, as outlined just above.

The fruit bodies can be still further stabilized while being loaded and progressed by using a support belt modification as shown in Figures 10 and 11. Here lower support belt 57a is modified by being made relatively thick, with fruit body recesses 75 therein spaced and arranged to coincide with apertures 22 on the carrier belt 11a to form in effect a composite fruit body receiving receptacle. To maintain the coincidence of apertures 22 and recesses 75, the carrier belt 11a and the recessed support belt 57a are progressed in exact synchronism. The two belts are arranged in the same manner as the belts in the device of Figures 5-9, inclusive, and the separation system is the same, as shown in Figure 11. The main difference in the two machines, except for the construction of the lower belt 57a is that we prefer to use a water spray 76 directed against the recesses 75 after they have passed about one-fourth of the way around the aft support drum 60 to insure the removal of trash from the recesses, as in this case substantially all trash will be carried in the recesses. The machine of Figures 10 and 11, mounted as shown in Figure 6, for example, is preferred where maximum stemming effectiveness is desired of fruit differing widely in size. This modification, however, is the most complicated of the machines described herein in that substantially exact synchronism of carrier and support belts must be maintained, requiring non-stretchable belt material, exact layout design and synchronous drive. However, for certain types of fruit, the machine of Figures 10 and 11 will be found the most satisfactory.

Various modifications of the machines above described can be made to suit special conditions if desired. Several such modifications are shown in Figures 12, 13, and 14.

For example, if wide carriers and/or high carrier speeds are used it may be desirable to provide a lower idler drum 100 on one end of the machine below the carrier drum 9, in order to provide greater space for fruit loading between carrier belt 11a and the support belt 57 for easy loading of the carrier belt, as shown best in Figure 12, showing a support belt type of machine.

In this case we may desire to mount motor 14 on an overhead frame 101 at the separation drum end of the machine and drive the separation drum 6 by a separation drum chain 102. Support belt 57 is driven through gears 103 and a support belt chain 103a, while loading brush 31 is driven by a loading brush chain 104 from the lower of gears 103. A rotating separation roller 110, later to be described, may also be driven by a roller chain 105 from the separation drum. As in the case of the support belt machine shown in Figures 6 and 7, we prefer to drive the support belt 57 at a slightly higher rate of speed than the carrier belt, and in the same direction. The fruit can then be loaded onto the carrier belt 11 by a belt conveyor 106 extending laterally across the carrier belt between the upper and lower carrier belt paths. A diagonal scraper 107 may be used to force the fruit off the belt conveyor 106 onto the upwardly rising carrier belt surface. The tumbling of the fruit on the inclined carrier belt aids in filling the apertures with fruit.

Cherries picked late in the growing season tend to have their stems less tightly held by the fruit, and instances can arise where a substantial percentage of stems are removed from the fruit by the action of loading brush 31. When this occurs it is desirable to remove output baffle 41 so that the fruit destemmed by the loading brush 31 can pass into a useful output chute 108. While some fruit having stems thereon will in this way pass the output of the machine, this disadvantage may well be overcome when a large percentage of fruit is destemmed by the loading brush 31.

Some lots of fruit are relatively large and may be sufficiently soft so that contact with a solid stem removing element, such as comb 42 or stationary separation bar 71, may bruise the fruit. We therefore may desire to replace these latter two devices by a rotating separation roller 110 having flexible teeth 111 thereon as best shown in Figure 14. This roller may be made of natural or synthetic rubber or similar substance, and teeth 111 may be of various flexibility, as may be necessary under the circumstances. Roller 110 is driven to revolve the teeth in the opposite direction to the motion of the carrier belt at the separation position S.

It has also been found that in some instances the fruit stems are relatively brittle, causing some stems to break off as they are forced against the outer edge of the apertures 22 as, for example, would happen when separation bar 71 contacted the fruit approaching the separation bar in Figure 8. This sharp edge has been found to break brittle stems occasionally so we may prefer to chamfer, bevel, or round the outer edges of the apertures as best shown at 112 in Figure 14.

While we may prefer to use the modifications shown in Figures 12, 13, and 14, in special cases, we do not desire to be limited to such use but may desire to utilize such devices in conjunction with any of the other apparatus arrangements previously described regardless of the particular type of fruit being processed.

All of the machines described herein are fast and accurate stemmers of fruit whose stems are sufficiently long to be gripped as described, and while the machines have been described as suitable for use in stemming cherries, similar long stemmed fruit such as plums, for example, can be likewise stemmed when the apertures and spacings are designed for proper fruit size, as taught herein.

It is to be noted that long stemmed fruit such as cherries often include clusters where the stems from a plurality of fruit are joined. The machines embodying the present invention have been described without provision for separating the fruit from such clusters, as many devices are known in the art for such purpose and such a device is no part of the present invention. As long as fruit with single stems thereon are available in front of loading brush 31, the machines operate efficiently as described and, if desired, declustering may be provided in a separate device with declustered fruit delivered to the machine from delivery belt 27.

From the above description it will be apparent that there is thus provided a device of the character described possessing the particular features of advantage before enumerated as desirable, but which obviously is susceptible of modification in its form, proportions, detail construction and arrangement of parts without depart-

We claim:

1. In a fruit processing machine wherein stemmed fruit is progressed by a carrier having a substantially horizontal path while each fruit is in a carrier recess having a separable substantially horizontal bottom with the normal stems of said fruit projecting upwardly out of said recess, and wherein said carrier passes upwardly around a drum to cause the projecting normal stems of said fruit to be gripped and to separate the carrier recesses from said bottom, the improvement comprising a barrier having an edge positioned adjacent the lower surface of said carrier as said carrier progresses upwardly away from said bottom, said edge being spaced from said lower surface sufficiently to permit fruit held by the stems thereof to pass said edge, and means above said barrier to separate fruit held by the stems thereof from the gripped stems, whereby fruit with abnormally short stems that are not gripped fall out of said recesses by gravity below said barrier and whereby fruit separated above the barrier from the gripped stems will be separated by said barrier from the short stemmed fruit leaving said carrier below said barrier.

2. In a fruit processing machine wherein stemmed fruit is progressed by a carrier having a substantially horizontal path while each fruit is in a carrier recess having a separable substantially horizontal bottom with the normal stems of said fruit projecting upwardly out of said recess, and wherein said carrier passes upwardly around a drum to cause the projecting normal stems of said fruit to be gripped and to separate the carrier recesses from said bottom, the improvement comprising a barrier having an edge portion of flexible material positioned adjacent the lower surface of said carrier as said carrier progresses upwardly away from said bottom, and means above said barrier to separate fruit held by the stems thereof from the gripped stems, whereby fruit with abnormally short stems that are not gripped fall out of said recesses by gravity below said barrier and whereby fruit separated above the barrier from the gripped stems will be separated by said barrier from short stemmed fruit leaving said carrier below said barrier.

PAUL WORMSER.
DAVID MADRID.

References Cited in the file of this patent

UNITED STATES PATENTS

| Number | Name | Date |
|---|---|---|
| 1,076,794 | Smith | Oct. 28, 1913 |
| 1,409,802 | Urschel | Mar. 14, 1922 |
| 1,409,803 | Urschel | Mar. 14, 1922 |
| 1,409,804 | Urschel | Mar. 14, 1922 |
| 1,734,788 | Babcock | Nov. 5, 1929 |
| 2,114,727 | Thys | Apr. 19, 1938 |
| 2,194,058 | Urschel | Mar. 19, 1940 |
| 2,243,530 | Kok | May 27, 1941 |
| 2,318,805 | Silva | May 11, 1943 |
| 2,358,500 | Frova | Sept. 19, 1944 |
| 2,360,412 | Frova | Oct. 17, 1944 |
| 2,361,834 | Frova | Oct. 31, 1944 |
| 2,415,418 | Coons | Feb. 11, 1947 |
| 2,462,682 | Schubert | Feb. 22, 1949 |
| 2,558,205 | Ashlock | June 26, 1951 |

FOREIGN PATENTS

| Number | Country | Date |
|---|---|---|
| 446,505 | France | Jan. 1, 1912 |
| 392,110 | Germany | Mar. 15, 1924 |
| 631,894 | France | Dec. 28, 1927 |
| 819,314 | France | July 5, 1937 |